United States Patent
Lehmann et al.

(10) Patent No.: US 6,265,554 B1
(45) Date of Patent: Jul. 24, 2001

(54) COPPER COMPLEX AZO DYES, THEIR PREPARATION AND THEIR USE

(75) Inventors: Urs Lehmann, Basel; Marcel Frick, Reinach, both of (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 09/669,463

(22) Filed: Sep. 25, 2000

(30) Foreign Application Priority Data

Sep. 27, 1999 (CH) .................................... 1762/99

(51) Int. Cl.$^7$ ..................... C09B 62/515; C09D 11/02; D06P 1/384

(52) U.S. Cl. ................... 534/629; 8/506; 8/543; 106/31.51; 347/1

(58) Field of Search ................ 534/629; 106/31.51; 8/506, 543; 347/1

(56) References Cited

U.S. PATENT DOCUMENTS

| | | | |
|---|---|---|---|
| 3,135,730 | * 6/1964 | Heyna et al. | 534/629 |
| 4,762,524 | 8/1988 | Chambers et al. | 8/549 |
| 5,074,914 | * 12/1991 | Shirota et al. | 106/31.51 |
| 5,102,459 | 4/1992 | Ritter et al. | 106/22 |

FOREIGN PATENT DOCUMENTS 1103886   4/1961 (DE) .

OTHER PUBLICATIONS

Chem. Abstract, vol. 55, 26468 for DE 1103886, (1961).
Patent Abstracts of Japan, Publication No. 02232274, (1990).

* cited by examiner

Primary Examiner—Fiona T. Powers
(74) Attorney, Agent, or Firm—Kevin T. Mansfield

(57) ABSTRACT

Dyes of formula (1)

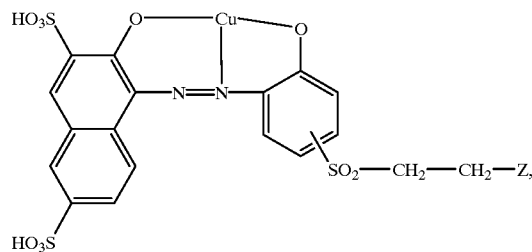

(1)

wherein

Z is $C_{10}$–$C_{20}$terpeneamino; or N-mono- or N,N-di-$C_1$–$C_{16}$alkylamino unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl, which further may be interrupted in the alkyl moiety by one, two or three oxygen atoms or —NH— groups, yield bluish magenta prints and dyeings having good light-fastness properties and a high colour brilliance.

11 Claims, No Drawings

COPPER COMPLEX AZO DYES, THEIR PREPARATION AND THEIR USE

The present invention relates to novel magenta dyes obtainable from reactive copper complex azo dyes by the addition or substitution of certain nitrogen-containing nucleophilic compounds. The present invention relates also to the preparation of those dyes and inks comprising the dyes according to the invention.

The dyes underlying the present invention are especially suitable for the printing of paper, textile fibre materials, plastics films or aluminium foils, especially using the ink-jet printing method, and for the dyeing of textile fibre materials, wood, paper, aluminium sheets or aluminium foils using traditional dyeing and printing methods and yield magenta dyeings having good light-fastness properties and a high colour brilliance, the shade of which is markedly shifted into the blue region.

Ink compositions, especially for use in multicolour printing, are nowadays subject to high demands. For example, it is of considerable importance that the dyes on which the inks are based correspond as accurately as possible to the three primary colours yellow, cyan and magenta. At the same time, the choice of suitable dyes is limited not only by the purity of the hue and the desired brilliance of the colour reproduction but also by the required shade.

The present invention is therefore based on the problem of providing new, improved magenta dyes for the dyeing and printing of paper, textile fibre materials, plastics films or aluminium foils, preferably using the ink-jet printing method, that yield pure, brilliant hues of a markedly bluish-red shade and that are at the same distinguished by good fastness to light.

It has now been found, surprisingly, that certain derivatives of C.I. Reactive Red 23 yield a very brilliant, bluish magenta which also has good fastness to light.

The present invention accordingly relates to dyes of formula (1)

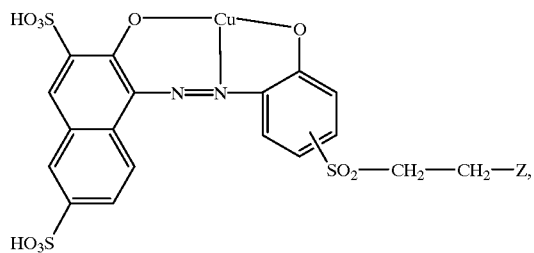

wherein

Z is $C_{10}$–$C_{20}$terpeneamino; or N-mono-$C_1$–$C_{16}$alkylamino or N,N-di-$C_1$–$C_{16}$alkylamino unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl, which further may be interrupted in the alkyl moiety by one, two or three oxygen atoms or —NH— groups.

Z as N-mono- or N,N-di-$C_1$–$C_{16}$alkylamino is, for example, methylamino, ethylamino, N,N-di-methylamino, N,N-diethylamino, isopropylamino, n-butylamino, sec-butylamino, isobutyamino or tert-butylamino, linear or branched pentylamino, hexylamino, heptylamino, octylamino, nonylamino, decylamino, undecylamino, dodecylamino, tridecylamino or tetradecyamino. The mentioned radicals are unsubstituted or substituted in the alkyl moiety, e.g. by phenyl (which may itself be substituted by carboxy, carbamoyl, sulfo or by sulfamoyl), amino, $C_2$–$C_4$alkanoylamino, e.g. acetylamino or propionylamino, hydroxy, sulfo, sulfato, carboxy, carbamoyl or by sulfamoyl. The mentioned radicals are uninterrupted or interrupted in the alkyl moiety by from one to three oxygen atoms or —NH— groups.

Examples of radicals that are substituted in the alkyl moiety and which further may be interrupted in the alkyl moiety by oxygen or by —NH— include N-β-aminoethylamino, N-β-aminopropylamino, N-β-hydroxyethylamino, N,N-di-β-hydroxyethylamino, N-2-(β-hydroxyethoxy)ethylamino, N-2-[2-(β-hydroxyethoxy)ethoxy]-ethylamino, N-2-(β-hydroxyethylamino)ethyl-N-(β-hydroxyethyl)amino, N-2-(β-aminoethylamino)ethylamino, N-β-sulfatoethylamino, N-β-sulfoethylamimo, N-carboxymethylamino, N-methyl-N-carboxymethylamino, N,N-dicarboxymethylamino, N-α-carboxyethylamino, N-β-carboxyethylamino, N-α,β-dicarboxyethylamino, N-α-carboxy-γ-carbamoylpropylamino, N-α-carboxy-β-hydroxyethylamino, N-α-carboxy-β-phenylethylamino, N-α,γ-dicarboxypropylamino, N-ethyl-N-β-hydroxyethylamino and N-methyl-N-β-hydroxyethylamino, especially N,N-di-β-hydroxyethylamino, N-2-(β-hydroxyethylamino)ethyl-N-(β-hydroxyethyl)amino, N-carboxymethylamino, N-methyl-N-carboxymethylamino, N,N-dicarboxymethylamino, N-α-carboxyethylamino, N-β-carboxyethylamino, N-α,β-dicarboxyethylamino, N-α-carboxy-γ-carbamoylpropylamino, N-α-carboxy-β-hydroxyethylamino, N-α-carboxy-β-phenylethylamino and N-α,β-dicarboxypropylamino.

Suitable unsubstituted and uninterrupted radicals are preferably N-mono-$C_8$–$C_{14}$alkylamino and especially N-mono-$C_{11}$–$C_{14}$alkylamino radicals, such as the radicals that are branched in the alkyl moiety that correspond, for example, to the formula

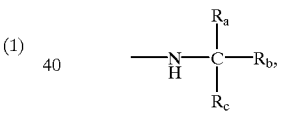

wherein the sum of the carbon atoms $R_a$+$R_b$+$R_c$ is from 11 to 14. An example of an amine forming the basis of the radical of the formula given above is ®Primene 81 R (Rohm & Haas).

Z as N-mono- or N,N-di-$C_1$–$C_{16}$alkylamino that is substituted in the alkyl moiety and which further may be interrupted in the alkyl moiety by oxygen or by —NH— is preferably N-mono- or N,N-di-$C_1$–$C_6$alkylamino and especially N-mono- or N,N-di-$C_1$–$C_4$alkylamino.

Preference is given to the radicals that are substituted in the alkyl moiety and which further may be interrupted in the alkyl moiety by oxygen or by —NH—.

Z as $C_{10}$–$C_{20}$terpeneamino, preferably $C_{20}$diterpeneamino, is an amino group mono-substituted at the nitrogen atom by a terpene hydrocarbon radical. Examples of terpene hydrocarbon radicals that come into consideration are acyclic, monocyclic or bicyclic C!oterpenes, acyclic, monocyclic, bicyclic or tricyclic $C_{15}$sesquiterpenes, acyclic, monocyclic or tricyclic $C_{20}$diterpenes, especially tricyclic $C_{20}$diterpenes and more especially dehydrogenated tricyclic $C_{20}$diterpenes, such as those derived from dehydroabietic acid. An example of such a dehydrogenated tricyclic $C_{20}$diterpeneamino radical that may be mentioned is the radical of formula

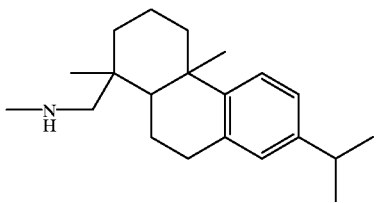

Preference is given to the dyes according to the invention wherein Z is $C_{20}$diterpeneamino; N-mono-$C_8$–$C_{14}$alkylamino; or N-mono-$C_1$–$C_6$alkylamino or N,N-di-$C_1$–$C_6$alkylamino substituted in the alkyl moiety by phenyl (which may itself be substituted by carboxy), amino, hydroxy, sulfo, sulfato, carboxy or by carbamoyl, which further may be interrupted in the alkyl moiety by one or two oxygen atoms or —NH— groups.

Special preference is given to the dyes according to the invention wherein

Z is $C_{20}$diterpeneamino; N-mono-$C_{11}$–$C_{14}$alkylamino; or N-mono-$C_1$–$C_6$alkylamino or N,N-di-$C_1$–$C_6$alkylamino substituted in the alkyl moiety by phenyl (which may itself be substituted by carboxy), hydroxy, sulfo, sulfato, carboxy or by carbamoyl, which further may be interrupted in the alkyl moiety by one or two oxygen atoms or —NH— groups.

Very special preference is given to the dyes according to the invention wherein Z is N-mono-$C_1$–$C_4$alkylamino or N,N-di-$C_1$–$C_4$alkylamino substituted in the alkyl moiety by phenyl, hydroxy, carboxy or by carbamoyl, which further may be interrupted in the alkyl moiety by oxygen or by —NH—.

In a preferred embodiment of the dyes according to the invention, the dye of formula (1) corresponds to a dye of formula (2)

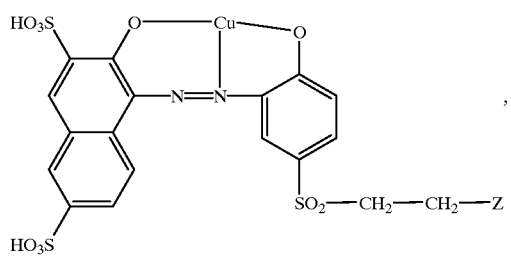

(2)

wherein

Z has the definitions and preferred meanings given above.

Special preference is given to the dyes according to the invention wherein the dye of formula (1) is a dye of formula (2) and Z is N-mono-$C_1$–$C_4$alkylamino or N,N-di-$C_1$–$C_4$alkylamino substituted in the alkyl moiety by phenyl, hydroxy, carboxy or by carbamoyl, preferably by hydroxy, carboxy or by carbamoyl, which further may be interrupted in the alkyl moiety by oxygen or by —NH—.

Very special preference is given to the dyes according to the invention wherein the dye of formula (1) is a dye of formula (2) and Z is N,N-di-β-hydroxyethylamino, N-2-(β-hydroxyethylamino)ethyl-N-(β-hydroxyethyl)amino, N-carboxymethylamino, N-methyl-N-carboxymethylamino, N,N-dicarboxymethylamino, N-α-carboxyethylamino, N-β-carboxyethylamino, N-α,β-dicarboxyethylamino, N-α-carboxy-γ-carbamoylpropylamino, N-α-carboxy-β-hydroxyethylamino, N-α-carboxy-β-phenylethylamino or N-α,γ-dicarboxypropylamino.

The present invention relates also to a process for the preparation of the dyes of formula (1), in which process a compound of formula (3)

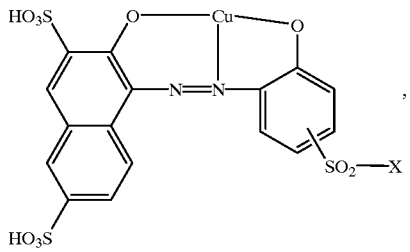

(3)

wherein X is vinyl or —$CH_2$—$CH_2$—U and U is a group removable under alkaline conditions, is reacted with at least an equimolar amount of a compound of formula (4)

$$Z\text{—}H \quad (4),$$

Z having the definitions and preferred meanings given above.

As a group U removable under alkaline conditions there comes into consideration, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—N($C_1$–$C_4$alkyl)$_2$. U is preferably a group of formula —Cl, —$OSO_3H$, —$SSO_3H$, —OCO—$CH_3$, —OCO—$C_6H_5$ or —$OPO_3H_2$, especially —Cl or —$OSO_3H$ and more especially —$OSO_3H$.

The compounds of formulae (3) and (4) are known or can be prepared according to processes known per se. A compound of formula (3) is, for example, C.I. Reactive Red 23.

It is advantageous to use an excess of the compound of formula (4), for example a molar excess of from 1.2 to 20, preferably from 1.5 to 10.

The reaction is advantageously carried out in the presence of a base, e.g. an alkali metal hydroxide, an alkali metal alcoholate or benzyltrimethylammonium hydroxide, preferably an alkali metal hydroxide, e.g. sodium hydroxide or potassium hydroxide, or an acid, e.g. sulfuric acid, glacial acetic acid or boron trifluoride, preferably a base.

Some aliphatic amines of formula (4) are sufficiently basic to be added under mild conditions, in some cases also without the presence of a base or acid. The reaction conditions are governed especially by the nucleophilicity of the compound of formula (4). The reaction is advantageously carried out at temperatures of from 10 to 100° C., preferably from 15 to 75° C. and especially from 20 to 50° C. These dependencies are generally known and are adequately described in the literature.

The sulfo groups in the dyes according to the invention are either in the form of the free sulfonic acid or, preferably, in the form of a salt thereof, e.g. in the form of a sodium, lithium, potassium or ammonium salt or in the form of a salt of an organic amine, e.g. in the form of a triethanolammonium salt or in the form of a salt of an amine Z—H of formula (4), that is suitable for the preparation of the dyes according to the invention, the definitions and preferred meanings given above for the amine radical Z applying in corresponding manner.

Special mention should be made of the salts of an amine of formula

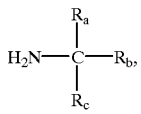

wherein the sum of the carbon atoms $R_a+R_b+R_c$ is from 11 to 14 (e.g. ®Primene 81 R, Rohm & Haas), which are suitable especially for the printing of aluminium sheets or foils.

The present invention accordingly relates also to the dyes of formula (1) wherein
Z is a group removable under alkaline conditions; $C_{10}$–$C_{20}$terpeneamino; or N-mono-$C_1$–$C_{16}$–alkylamino or N,N-di-$C_1$–$C_{16}$alkylamino unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl, which further may be interrupted in the alkyl moiety by one, two or three oxygen atoms or —NH— groups,
in the form of a salt of an amine of formula

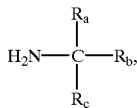

wherein the sum of the carbon atoms $R_a+R_b+R_c$ is from 11 to 14.

Z as a group removable under alkaline conditions has the definitions and preferred meanings given above for U. Z also has the definitions and preferred meanings given above for formula (1).

The present invention relates also to inks, for example aqueous inks, comprising a dye of formula (1) wherein Z has the definitions and preferred meanings given above.

The dyes used in the inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example, by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. As a lower limit, a limit of 1.5% by weight, preferably 2% by weight and especially 3% by weight, is preferred.

The inks may comprise organic solvents, for example water-miscible organic solvents, e.g. $C_1$–$C_4$alcohols, such as methanol, ethanol, n-propanol, isopropanol, n-butanol, sec-butanol, tert-butanol and isobutanol; amides, e.g. dimethylformamide and dimethylacetamide; ketones or ketone alcohols, e.g. acetone, methyl isobutyl ketone, diacetone alcohol; ethers, e.g. tetrahydrofuran and dioxane; nitrogen-containing heterocyclic compounds, e.g. N-methyl-2-pyrrolidone and 1,3-dimethyl-2-imidazolidone; polyalkylene glycols, e.g. polyethylene glycol or polypropylene glycol; $C_2$–$C_6$alkylene glycols and thioglycols, e.g. ethylene glycol, propylene glycol, butylene glycol, 1,5-pentanediol, thiodiglycol, hexylene glycol, diethylene glycol, triethylene glycol, tetraethylene glycol and diethylene glycol monobutyl ether; further polyols, e.g. glycerol, and 1,2,6-hexanetriol; and $C_1$–$C_4$alkyl ethers of polyhydric alcohols, e.g. 2-methoxyethanol, 1-methoxypropanol, 2-(2-methoxyethoxy)ethanol, 2-(2-ethoxyethoxy)-ethanol, 2-[2-(2-methoxyethoxy)ethoxy]-ethanol and 2-[2-(2-ethoxyethoxyy ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

The inks may also comprise solubilisers, e.g. F-caprolactam.

The inks may comprise thickeners of natural or synthetic origin inter alia for the purpose of adjusting the viscosity.

Examples of thickeners that may be mentioned are commercially available alginate thickeners, starch ethers or locust bean flour ethers, especially sodium alginate on its own or in admixture with modified cellulose, e.g. methylcellulose, ethylcellulose, carboxymethycellulose, hydroxyethylcellulose, methylhydroxyethylcellulose, hydroxypropyl cellulose or hydroxypropyl methylcellulose, especially with preferably from 20 to 25% by weight carboxymethylcellulose. Synthetic thickeners that may be mentioned are, for example, those based on poly(meth)acrylic acids or poly(meth)acrylamides.

The inks comprise such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, polyphosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and preferably from 1 to 10 mPa·s.

The inks may also comprise customary additives, such as antifoam agents or especially substances that inhibit the growth of fungi and/or bacteria. Such additives are usually used in amounts of from 0.01 to 1% by weight, based on the total weight of the ink.

The inks can be prepared in customary manner by mixing the individual constituents together, for example in the desired amount of water.

The inks according to the invention are especially suitable for use in recording systems of the type in which an ink is expressed in the form of droplets from a small aperture, the droplets being directed onto a substrate on which an image is produced. Suitable substrates are, for example, textile fibre materials, paper, plastics or aluminium foils. Suitable recording systems are, for example, commercially available ink-jet printers for use in paper or textile printing, or writing implements, such as fountain pens or ballpoint pens, especially ink-jet printers.

Depending upon the nature of the use it may be necessary, for example, to adjust the viscosity or other physical properties of the ink, especially those properties which have an effect upon the affinity for the substrate in question. For printing textile fibre materials, paper or plastics films it is preferable to use aqueous inks.

Examples of paper that can be printed using the inks according to the invention include commercially available ink-jet paper, photographic paper, glossy paper and plastics-coated paper, e.g. Epson ink-jet paper, Epson photo paper, Epson glossy paper, Epson glossy film, HP special ink-jet paper, Encad photo gloss paper and Ilford photo paper. Plastics films that can be printed using the inks according to the invention are, for example, transparent or milky/opaque. Suitable plastics films are, for example, 3M transparency film. Glossy paper, e.g. Epson glossy paper, is preferred.

Textile fibre materials that come into consideration are especially nitrogen-containing or hydroxy-group-containing fibre materials, e.g. textile fibre materials of cellulose, silk, wool or synthetic polyamides.

Examples of aluminium foils are surface-treated foils, e.g. vinyl-coated aluminium foils.

The present invention accordingly also relates to a method of printing textile fibre materials, paper, plastics or aluminium foils, especially in accordance with the inkjet printing method, which comprises using an ink comprising a dye of formula (1), wherein Z has the definitions and preferred meanings given above.

Preference is given to ink-jet printing methods for the printing of textile fibre materials, paper or plastics films wherein an aqueous ink is used.

In ink-jet printing, individual droplets of the ink are sprayed onto a substrate in a controlled manner from a nozzle. For this purpose, predominantly the continuous ink-jet method and the drop-on-demand method are used. In the continuous ink-jet method, the droplets are produced continuously and any droplets not required for the printing are conveyed to a collecting vessel and recycled, whereas in the drop-on-demand method droplets are produced and printed as required; that is to say droplets are produced only when required for the printing. The production of the droplets can be effected, for example, by means of a piezo-inkjet head or by means of thermal energy (bubble jet). For the process according to the invention, printing by means of a piezo-inkjet head is preferred. Also preferred for the process according to the invention is printing in accordance with the continuous ink-jet method.

The inks according to the invention are especially suitable as magenta component for multicolour printing.

The prints obtained are distinguished especially by good light-fastness properties and a high colour brilliance The dyes according to the invention are also suitable for the dyeing and printing of hydroxy-group-containing and nitrogen-containing fibre materials, paper and aluminium sheets or aluminium foils in accordance with methods known per se, for example immersion processes, roller printing or film printing. The dyes according to the invention are also suitable for the dyeing or mordanting of wood.

Examples of fibre materials are silk, wool, synthetic polyamide fibres and polyurethanes and also cellulosic fibre materials of all kinds. Cellulosic fibre materials are, for example, the natural cellulosic fibres, such as cotton, linen and hemp, as well as cellulose and regenerated cellulose. The dyes according to the invention are also suitable for the dyeing or printing of hydroxy-group-containing fibres that are present in blend fabrics, for example mixtures of cotton with polyester fibres or polyamide fibres. The above-mentioned textile material can be in a wide variety of processing forms, e.g. in the form of fibres, yarns, woven fabrics or knitted fabrics.

Examples of aluminium sheets or foils are surface-treated sheets or foils, e.g. vinyl-coated aluminium sheets or foils. The present invention accordingly also relates to the use of the dyes according to the invention in the dyeing or printing of textile fibre materials, especially hydroxy-group-containing or nitrogen-containing fibre materials, wood, paper, aluminium sheets or aluminium foils.

The dyes according to the invention can be used for dyeing or printing in the generally customary, optionally preformulated form, for example in the form of aqueous dye solutions for the exhaust process or in the form of print pastes for use in screen printing.

The dyeings and prints obtained have good all-round properties, especially good fastness to light and a high colour brilliance. Dyeings and prints on hydroxy-group-containing or nitrogen-containing fibre materials are also distinguished by good fastness to rubbing, to wetting and to wet rubbing.

The following Examples serve to illustrate the invention. The temperatures are given in degrees Celsius. Unless otherwise indicated, parts are parts by weight and percentages relate to percent by weight. The relationship between parts by weight and parts by volume is the same as that between kilograms and liters.

EXAMPLE 1

A neutral solution of 14.8 parts of aspartic acid in 50 parts of water is added at room temperature to a solution of 7.5 parts of the dye of formula (101)

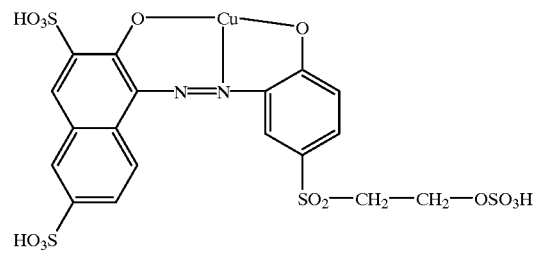

(101)

in 50 parts of water and the pH is adjusted to 10 with a 15% sodium hydroxide solution. To complete the reaction, stirring is carried out under those conditions for several hours (monitoring by means of thin-layer chromatography). The reaction mixture is then adjusted to pH 8 with a 16% hydrochloric acid, clarified by filtration, freed of salt by dialysis and freeze-dried, yielding 5.2 parts of a dye which in the form of the free acid corresponds to formula (102)

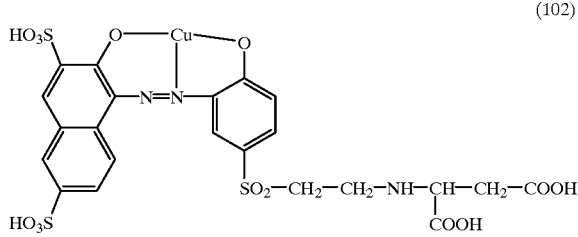
(102)

and yields prints or dyeings on wool, silk and paper in a clear, markedly bluish magenta shade having good fastness to light and a high colour brilliance.

EXAMPLE 2

6.7 parts of the dye of formula (101) are dissolved in 100 parts of water at room temperature, and 1.52 parts of N-methylglycine are added. The pH of the resulting solution is adjusted to 10 with a 15% sodium hydroxide solution and the reaction mixture is heated to 50° C. To complete the reaction, stirring is carried out under those conditions for about one hour (monitoring by means of thin-layer chromatography). The reaction mixture is then adjusted to pH 8 with a 16% hydrochloric acid, clarified by filtration, freed of salt by dialysis and freeze-dried, yielding 6.3 parts of a dye which in the form of the free acid corresponds to formula (103)

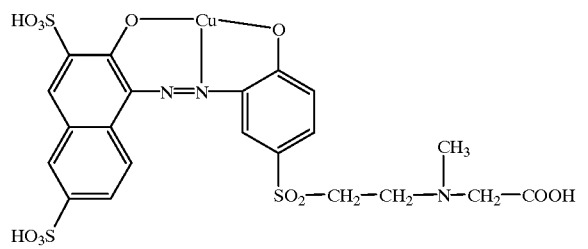
(103)

and yields prints or dyeings on wool, silk and paper in a clear, markedly bluish magenta shade having good fastness to light and a high colour brilliance.

EXAMPLES 3 TO 12

Analogously to the procedure described in Example 1 or 2, it is possible to prepare the dyes of the general formula

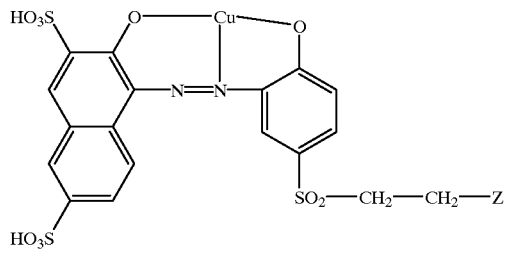

wherein Z has the definitions given in Table 1 by using a compound of formula Z—H instead of aspartic acid or N-methylglycine:

TABLE 1

| Example | Z |
|---|---|
| 3 | —N(CH₂—CH₂—OH)(CH₂—CH₂—NH—CH₂—CH₂—OH) |
| 4 | —N(CH₂—CH₂—OH)₂ |
| 5 | —NH—CH₂—COOH |
| 6 | —NH—CH₂—CH₂—COOH |
| 7 | —N(CH₂—COOH)₂ |
| 8 | —NH—CH(COOH)—CH₃ |
| 9 | —NH—CH(COOH)—CH₂—OH |
| 10 | —NH—CH(COOH)—CH₂—CH₂—CONH₂ |
| 11 | —NH—CH(COOH)—CH₂—CH₂—COOH |
| 12 | —NH—CH(COOH)—CH₂—C₆H₅ |

The dyes yield prints and dyeings on wool, silk and paper in a clear, markedly bluish magenta shade having good fastness to light and a high colour brilliance.

EXAMPLE 13

A solution of 3.4 parts of the dye of formula (101) in 90 parts of water is vinylated by the addition of a 2N sodium hydroxide solution at pH 10 and a temperature of from 0 to 10° C. 27.4 parts of an aqueous 0.6 molar ®Primene 81 R solution are added dropwise to the resulting solution at from 0 to 5° C. in the course of a good hour and then the temperature is increased successively to 80° C., the pH being maintained at 10 by the addition of a 2N sodium hydroxide solution. When the reaction is complete (monitoring by means of thin-layer chromatography), the reaction mixture is first cooled to room temperature and then the mixture is cooled further to about 0° C. and the pH is adjusted to 6.5 with an aqueous hydrochloric acid (16%). The resulting precipitate is washed with ice-water and then dried in vacuo, yielding 3.8 parts of a dye which in salt form corresponds to formula (104)

(104)

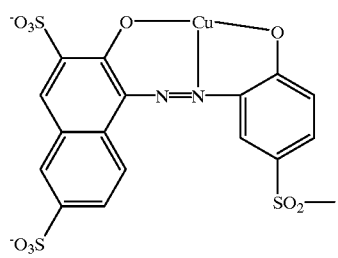 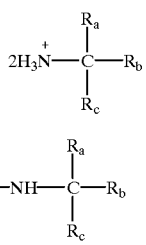

wherein the sum of the carbon atoms $R_a+R_b+R_c$ is from 11 to 14. The dye yields prints on aluminium sheet or aluminium foil in a clear red shade having good fastness to light.

EXAMPLE 14

A solution of 3.4 parts of the dye of formula (101) in 90 parts of water is adjusted to pH 4.5 with a 1N sodium hydroxide solution. 18.2 parts of an aqueous 0.6 molar ®Primene 81 R solution are added dropwise to the resulting solution at from 0 to 5° C. in the course of 1.5 hours. The reaction mixture is stirred at that temperature overnight and then the liquid components are decanted off from the solid reaction mass. The residue is repeatedly washed with water, then dissolved in ethanol, concentrated by evaporation and dried in vacuo at from 40 to 50° C., yielding 3.4 parts of the dye of formula (101) in triprimene salt form

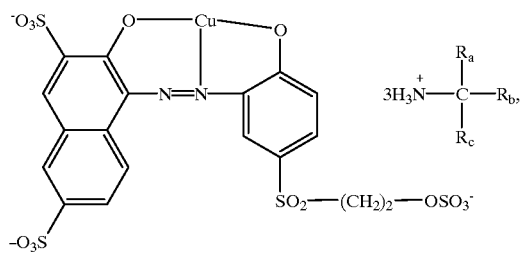

wherein the sum of the carbon atoms $R_a+R_b+R_c$ is from 11 to 14. The dye yields prints on aluminium sheet or aluminium foil in a clear red shade having good fastness to light.

APPLICATION EXAMPLE 1

3.55 parts of the dye according to Example 1 are dissolved in 100 parts of distilled water and filtered. The ink so obtained is used to print a commercially available ink-jet paper, photographic paper or a glossy film (e.g. Epson glossy film) using a drop-on-demand ink-jet printer.

APPLICATION EXAMPLE 2 a) A silk fabric is pad-dyed with an aqueous liquor comprising 150 g/l of a commercially available alginate thickener, 50 g/l of urea and 50 9/1 of an aqueous ammonium tartrate solution (25% strength) (liquor pick-up 90%) and dried.

b) The silk fabric pretreated in accordance with a) is printed with an ink A containing
5% by weight of the dye according to Example 1,
20% by weight of 1,2-propylene glycol and
75% by weight of water
using a drop-on-demand piezo inkjet head. The print is dried and fixed at 102° C. in saturated steam and then washed off.

APPLICATION EXAMPLE 3 a) Mercerised cotton satin is pad-dyed with a liquor comprising 30 g/l of sodium carbonate (liquor pick-up 70%) and dried.

b) The cotton satin pretreated in accordance with Step a) is printed with an aqueous ink having a viscosity of 2 mpa·s, containing
15% by weight of the dye according to Example 1,
15% by weight of 1,2-propylene glycol,
0.5% by weight of borax and
69.5% by weight of water
using a drop-on-demand ink-jet head (bubble jet). The print is dried completely and fixed for 4 minutes at 102° C. in saturated steam, cold-rinsed, washed off at boiling, rinsed again and dried.

APPLICATION EXAMPLE 4 a) A printing ink is prepared from:

8% by weight of the dye according to Example 13,
8% by weight of nitrocellulose A 400,
6% by weight of ketone resin SK,
1% by weight of dibutyl phthalate,
20% by weight of 1-methoxypropanol,
20% by weight of methyl isobutyl ketone and
37% by weight of ethanol (abs.), by mixing the solvents together, then dissolving the resins and finally the dye therein. The printing ink is used to screen-print vinyl-coated aluminium sheet or aluminium foil.

APPLICATION EXAMPLE 5

10 parts of woollen knitting yarn are stirred at 30° C. into a dyebath that contains, per 100 parts of water, 0.8 part of the dye according to Example 1, 0.5 part of sodium sulfate and 2 parts of sodium acetate, and the pH value is adjusted to 4.5 with acetic acid (80%). The liquor is brought to the boil over the course of 45 minutes and maintained at boiling temperature for a further 45 to 70 minutes. The dyed material is then removed, rinsed thoroughly with cold water and dried.

APPLICATION EXAMPLE 6

While stirring rapidly, 3 parts of the dye obtained according to Example 1 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed fabric is steamed in saturated steam at 102° C. for 2 minutes. The printed fabric is then rinsed, if desired soaped at the boil and again rinsed, and then dried.

What is claimed is:

1. A dye of formula (1)

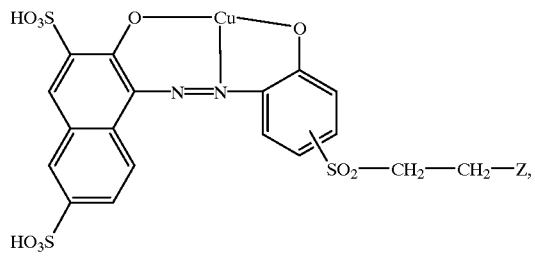

wherein

Z is $C_{10}$–$C_{20}$terpeneamino; or N-mono-$C_1$–$C_{16}$alkylamino or N,N-di-$C_1$–$C_{16}$alkylamino unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl, which further may be interrupted in the alkyl moiety by one, two or three oxygen atoms or —NH— groups.

2. A dye according to claim 1, wherein

Z is $C_{20}$diterpeneamino; N-mono-$C_8$–$C_{14}$alkylamino; or N-mono-$C_1$–$C_6$alkylamino or N,N-di-$C_1$–$C_6$alkylamino substituted in the alkyl moiety by phenyl (which may itself be substituted by carboxy), amino, hydroxy, sulfo, sulfato, carboxy or by carbamoyl, which further may be interrupted in the alkyl moiety by one or two oxygen atoms or —NH— groups.

3. A dye according to claim 1, wherein

Z is $C_{20}$diterpeneamino; N-mono-$C_{11}$–$C_{14}$alkylamino; or N-mono-$C_1$–$C_6$alkylamino or N,N-di-$C_1$–$C_6$alkylamino substituted in the alkyl moiety by phenyl (which may itself be substituted by carboxy), hydroxy, sulfo, sulfato, carboxy or by carbamoyl, which further may be interrupted in the alkyl moiety by one or two oxygen atoms or —NH— groups.

4. A dye according to claim 1, wherein

Z is N-mono-$C_1$–$C_4$alkylamino or N,N-di-$C_1$–$C_4$alkylamino substituted in the alkyl moiety by phenyl, hydroxy, carboxy or by carbamoyl, which further may be interrupted in the alkyl moiety by oxygen or —NH—.

5. A dye according to claim 1, wherein the dye of formula (1) is a dye of formula (2)

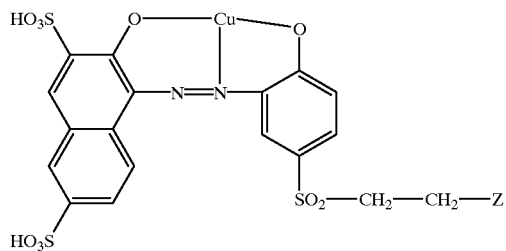

wherein Z is as defined in claim 1.

6. A process for the preparation of a dye according to claim 1, in which process a compound of formula (3)

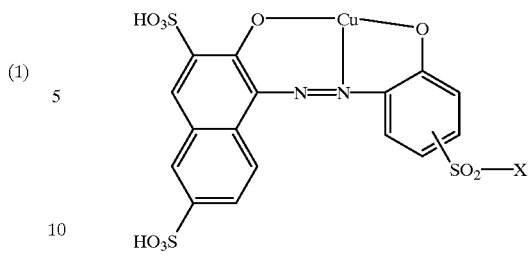

wherein X is vinyl or —$CH_2$—$CH_2$—U and U is a group removable under alkaline conditons, is reacted with at least an equimolar amount of a compound of formula (4)

Z being as defined in claim 1.

7. An ink comprising a dye of formula (1)

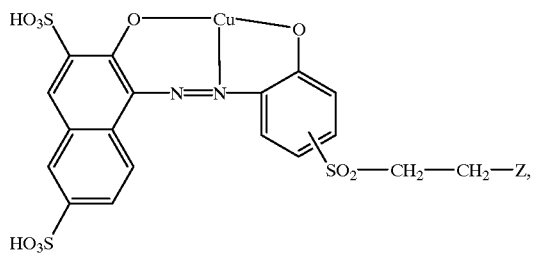

wherein

Z is $C_{10}$–$C_{20}$terpeneamino; or N-mono-$C_1$–$C_{16}$alkylamino or N,N-di-$C_1$–$C_{16}$alkylamino unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl, which further may be interrupted in the alkyl moiety by one, two or three oxygen atoms or —NH— groups.

8. An ink according to claim 7, which has a dye content of from 1 to 35% by weight.

9. A process for printing paper, textile fibre materials, plastics films or aluminium foils in accordance with the ink-jet printing method, which comprises using an ink according to claim 7.

10. A process for dyeing or printing textile fibre materials, wood, paper, aluminium sheets or aluminium foils, which comprises applying to said material a dye according to claim 1.

11. A dye of formula (1)

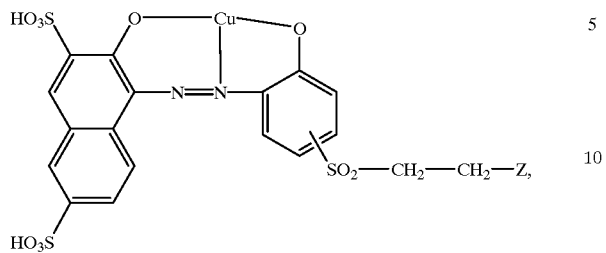 (1)

wherein
Z is a group removable under alkaline conditions; $C_{10}$–$C_{20}$terpeneamino; or N-mono-$C_1$–$C_{16}$-alkylamino or N,N-di-$C_1$–$C_{16}$alkylamino unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl, which further may be interrupted in the alkyl moiety by one, two or three oxygen atoms or —NH— groups, in the form of a salt of an amine of formula

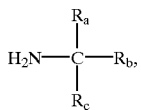

wherein the sum of the carbon atoms $R_a+R_b+R_c$ is from 11 to 14.

* * * * *